United States Patent
Miura

(10) Patent No.: US 10,093,037 B2
(45) Date of Patent: Oct. 9, 2018

(54) MANUFACTURING SYSTEM IN WHICH WORKPIECE IS TRANSFERRED

(71) Applicant: FANUC CORPORATION, Yamanashi (JP)

(72) Inventor: Masahiro Miura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 109 days.

(21) Appl. No.: 15/377,331

(22) Filed: Dec. 13, 2016

(65) Prior Publication Data

US 2017/0183097 A1    Jun. 29, 2017

(30) Foreign Application Priority Data

Dec. 24, 2015  (JP) ................................ 2015-251791

(51) Int. Cl.

| | |
|---|---|
| B29C 31/00 | (2006.01) |
| B33Y 30/00 | (2015.01) |
| B33Y 40/00 | (2015.01) |
| B29C 45/03 | (2006.01) |
| B29C 69/00 | (2006.01) |
| B64C 39/02 | (2006.01) |
| B64D 47/08 | (2006.01) |
| G08G 5/00 | (2006.01) |
| H04L 29/08 | (2006.01) |
| B29C 64/00 | (2017.01) |

(52) U.S. Cl.
CPC ............ B29C 31/008 (2013.01); B29C 45/03 (2013.01); B29C 64/00 (2017.08); B29C 69/001 (2013.01); B33Y 30/00 (2014.12); B33Y 40/00 (2014.12); B64C 39/024 (2013.01); B64D 47/08 (2013.01); G08G 5/003 (2013.01); H04L 67/125 (2013.01); *B64C 2201/128* (2013.01)

(58) Field of Classification Search
CPC .................................................... B29C 31/008
See application file for complete search history.

(56) References Cited

U.S. PATENT DOCUMENTS

| 8,091,461 B1 * | 1/2012 | Buescher ................. F41F 7/00 114/318 |
| 2005/0006525 A1 * | 1/2005 | Byers ...................... B64C 1/061 244/118.1 |

(Continued)

FOREIGN PATENT DOCUMENTS

| CN | 105069595 A | 11/2015 |
| JP | A-H03-142150 | 6/1991 |

(Continued)

OTHER PUBLICATIONS

Notification of Reasons for Refusal for Japanese Application No. 2015-251791, dated Oct. 16, 2017, including English language translation, 6 pages.

*Primary Examiner* — Timothy Kennedy
(74) *Attorney, Agent, or Firm* — RatnerPrestia

(57) ABSTRACT

A manufacturing system includes a plurality of manufacturing process stations for processing a workpiece, and at least one drone for transferring the workpiece among the manufacturing process stations. It is preferable that the manufacturing system includes a detecting station for detecting contamination or corrosion of the at least one drone, and a washing station for washing the at least one drone.

11 Claims, 5 Drawing Sheets

(56) References Cited

U.S. PATENT DOCUMENTS

| | | | |
|---|---|---|---|
| 2006/0011721 A1* | 1/2006 | Olsen, III | G06Q 10/06 235/385 |
| 2006/0249622 A1* | 11/2006 | Steele | B64F 1/02 244/115 |
| 2011/0017863 A1* | 1/2011 | Goossen | F41G 7/303 244/3.14 |
| 2011/0084162 A1* | 4/2011 | Goossen | B64C 39/024 244/12.1 |
| 2014/0098990 A1 | 4/2014 | Vian et al. | |
| 2015/0158599 A1* | 6/2015 | Sisko | B64F 1/32 244/114 R |
| 2016/0070265 A1* | 3/2016 | Liu | B64C 39/024 701/3 |
| 2017/0039510 A1 | 2/2017 | Ogilvie et al. | |
| 2017/0178071 A1 | 6/2017 | Ogilvie et al. | |

FOREIGN PATENT DOCUMENTS

| | | |
|---|---|---|
| JP | A-2003-72920 | 3/2003 |
| JP | 2014078232 A | 5/2014 |
| JP | 2017517466 A | 6/2017 |
| WO | 2015155087 A1 | 10/2015 |

\* cited by examiner

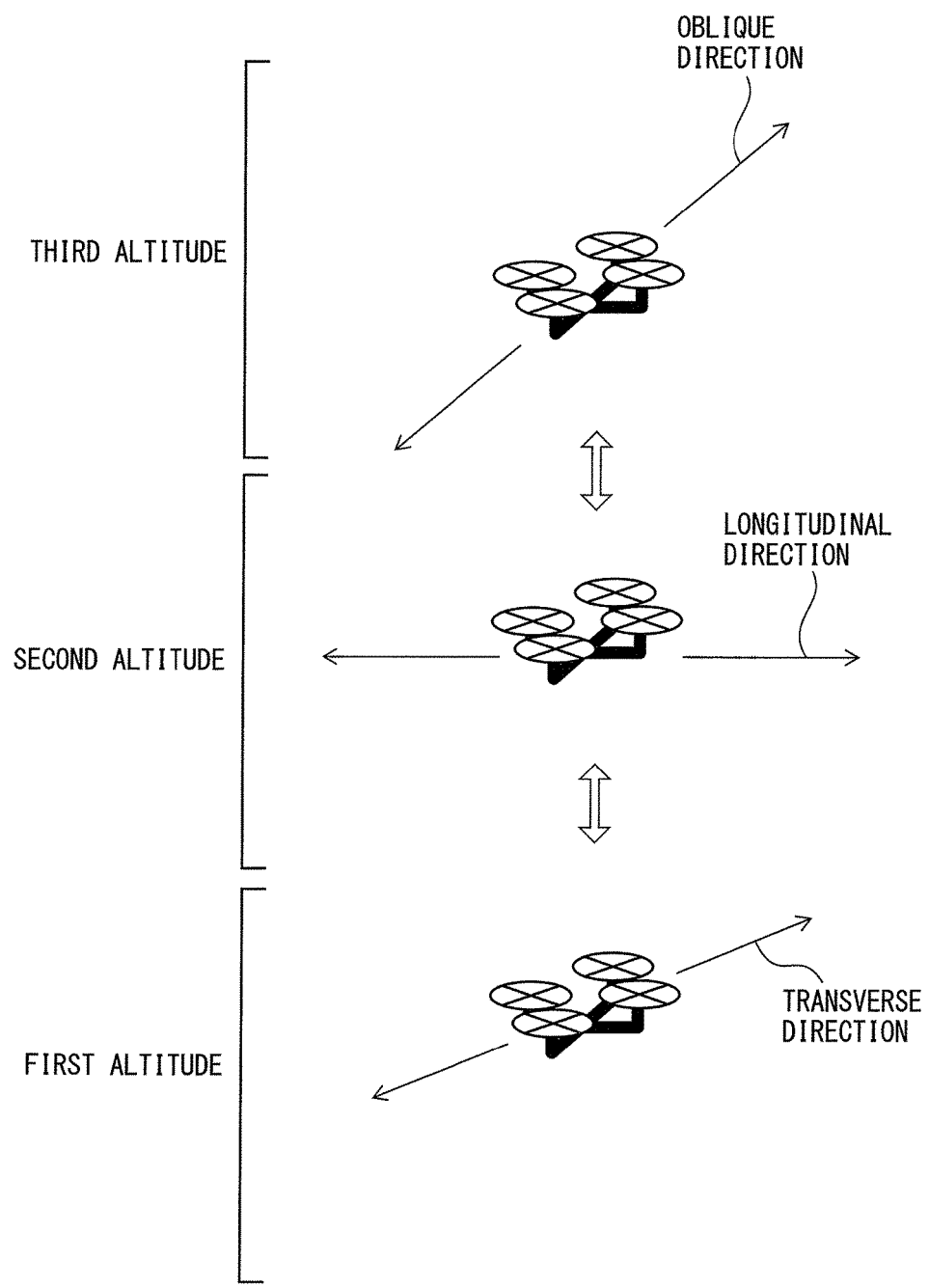

MANUFACTURING SYSTEM IN WHICH WORKPIECE IS TRANSFERRED

BACKGROUND OF THE INVENTION

1. Field of the Invention

The present invention relates to a manufacturing system in which a workpiece is transferred among a plurality of manufacturing process stations.

2. Description of the Related Art

In general, a manufacturing system includes a plurality of manufacturing process stations for processing workpieces. For the sake of efficiency, a manufacturing system for manufacturing of a small variety of products in large quantities has been demanded. Thus, in the manufacturing system, the sequence of processing and assembling of products is standardized, and all workpieces are successively transferred along a single transfer route among manufacturing process stations. Specifically, the manufacturing process stations are connected by transfer means, e.g., conveyor belts. Such a manufacturing system can manufacture products at regular time intervals.

For example, Japanese Unexamined Patent Publication (Kokai) No. 03-142150 discloses an automatic processing system, in which manufacturing process stations including machine tools, etc., are installed in a factory, and workpieces are transferred among the manufacturing process stations. Further, Japanese Unexamined Patent Publication (Kokai) No. 2003-072920 discloses a transfer system for causing conveyor belts as transfer means to transfer products. Examples of the transfer means may include a loader and an industrial robot.

SUMMARY OF THE INVENTION

Future intelligent manufacturing systems are demanded to manufacture products individually customized in careful response to the requests of customers. Production of custom-made products customized for each customer eliminates a simple price war which tends to be produced in high-volume manufacturing.

In order to realize such intelligent manufacturing systems, it is necessary to analyze the orders of customers, to determine parts and manufacturing process stations to be used, and to simulate the sequence of arrangement of the manufacturing process stations. It is also necessary to quickly reflect a result of the simulation in the manufacturing system. Thus, changes in the manufacturing specification of products, enhancement of processing facilities, or equipment failures can be handled by flexibly changing the arrangement and sequence of the manufacturing process stations.

However, when a plurality of manufacturing process stations are connected by transfer means, e.g., conveyor belts as in the current manufacturing system, the arrangement and sequence of the manufacturing process stations cannot be flexibly changed depending on the types of products. Thus, it is difficult to manufacture products individually customized in accordance with the demand of customers.

The present invention was made in light of the circumstances described above and has an object to provide a manufacturing system in which a transfer route among a plurality of manufacturing process stations can be freely changed.

To achieve the above object, according to a first aspect of the invention, there is provided a manufacturing system includes a plurality of manufacturing process stations for processing a workpiece, and at least one drone for transferring the workpiece among the plurality of manufacturing process stations.

According to a second aspect of the invention, in the manufacturing system according to the first aspect of the invention, at least one of the manufacturing process stations is disposed on a first floor, and the remaining manufacturing process stations are disposed on a second floor. The drone transfers the workpiece via an open ceiling space between the first floor and the second floor.

According to a third aspect of the invention, the manufacturing system according to the first or second aspect of the invention further includes a server for intensively managing a flight route of the at least one drone. The server transmits a command to the at least one drone by wireless communication.

According to a fourth aspect of the invention, the manufacturing system according to the third aspect of the invention further includes a detecting station for detecting contamination or corrosion of the at least one drone, and a washing station for washing the at least one drone when the detecting station detects contamination or corrosion of the at least one drone. The at least one drone moves to the detecting station in response to a command from the server.

According to a fifth aspect of the invention, in the manufacturing system according to any of the first to fourth aspects of the invention, at least one of the plurality of manufacturing process stations includes a charging station for charging a battery as a power source of the at least one drone.

According to a sixth aspect of the invention, in the manufacturing system according to any of the first to fifth aspects of the invention, the workpiece has a wireless tag, and the at least one drone identifies the workpiece by wireless communication via the wireless tag, and detects an accidental fall of the workpiece.

According to a seventh aspect of the invention, in the manufacturing system according to any of the first to sixth aspects of the invention, the at least one drone has a camera, and the at least one drone performs, using the camera, at least one of avoidance of collision with another drone, fine tuning of a landing site, and confirmation of safety.

These objects, features, and advantages of the present invention and other objects, features, and advantages will become further clearer from the detailed description of typical embodiments illustrated in the appended drawings.

BRIEF DESCRIPTION OF THE DRAWINGS

FIG. 3 is a view illustrating the position in height of a drone.

DETAILED DESCRIPTION

Figure 1:
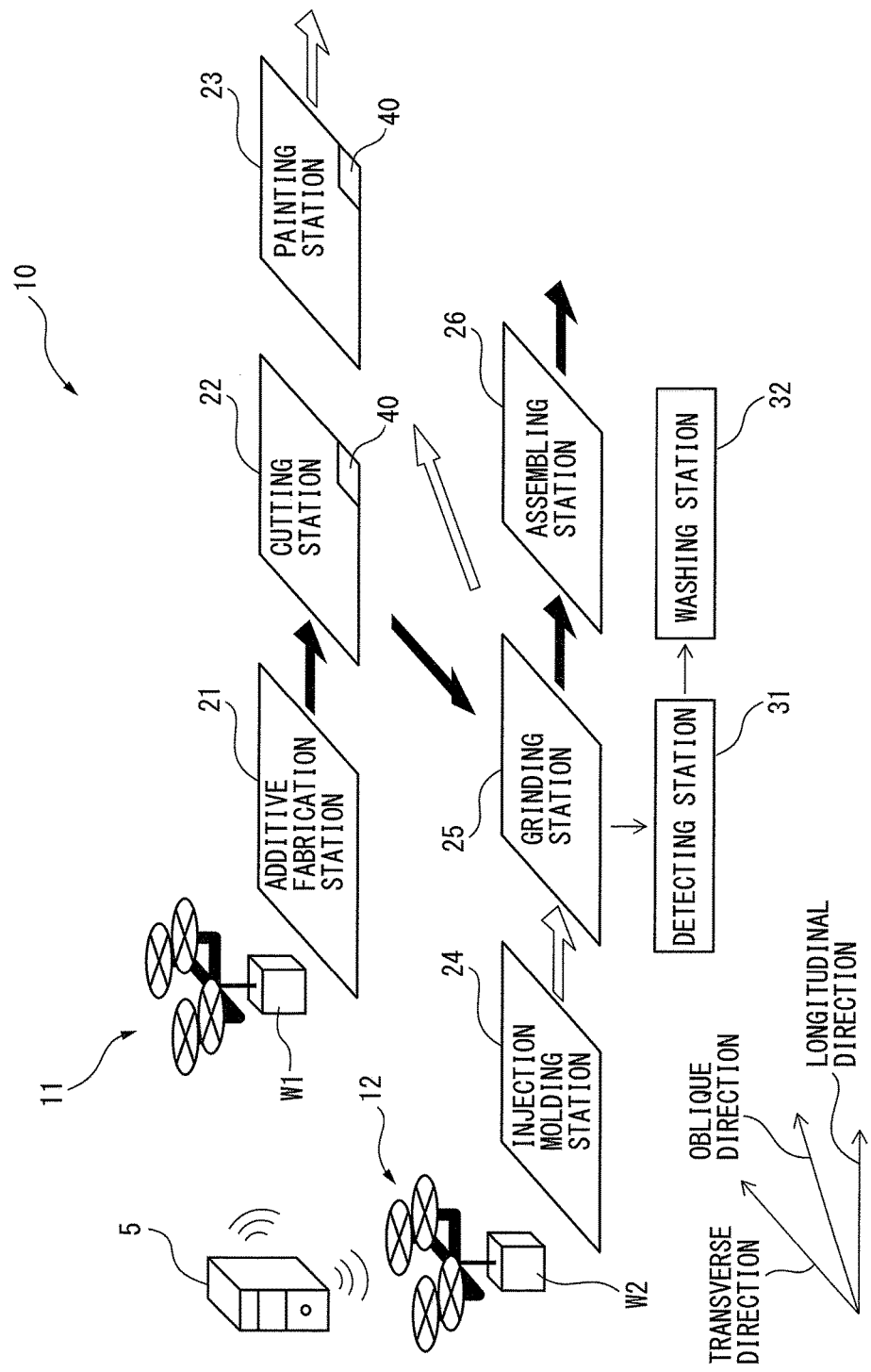
FIG. 1 is a diagram of a manufacturing system according to the present invention.

Embodiments of the present invention will be described below with reference to the accompanying drawings. In the following figures, similar members are designated with the same reference numerals. These figures are properly modified in scale to assist the understanding thereof.

FIG. 1 is a diagram of a manufacturing system according to the present invention. As shown in FIG. 1, a manufacturing system 10 according to the present invention mainly includes a plurality of manufacturing process stations 21 to 26 and at least one of drones 11 and 12.

In an example shown in FIG. 1, the manufacturing process stations 21 to 26 include an additive fabrication station 21 for performing additive fabrication using a workpiece, a cutting station 22 for cutting a workpiece, a painting station 23 for painting a workpiece, an injection molding station 24 for molding a workpiece by injection molding, a grinding station 25 for grinding a workpiece, and an assembling station 26 for assembling a workpiece. Note that the workpiece in the present invention may include both a material and a component.

In the example shown in FIG. 1, the manufacturing process stations 21 to 26 are arranged at predetermined positions in a 3-by-2 matrix. As illustrated, the manufacturing process station 21, the cutting station 22, and the painting station 23 are aligned, in this order, in a row. In a row adjacent to these stations, the injection molding station 24, the grinding station 25, and the assembling station 26 are aligned in this order. Note that the manufacturing system 10 may include another station for another manufacturing process, if need arises.

In the example shown in FIG. 1, the manufacturing system 10 further includes a detecting station 31 for detecting the contamination or corrosion of the drones 11 and 12 that will be described later, and a washing station 32 for washing the drones 11 and 12 when the detecting station 31 detects the contamination or corrosion of the drones 11 and 12. The detecting station 31 and the washing station 32 may be integrally formed.

Further, in FIG. 1, charging stations 40 for charging batteries for driving the drones 11 and 12 are incorporated in the cutting station 22 and the painting station 23. The charging stations 40 may be incorporated in the other manufacturing process stations 21 and 24 to 26.

The drones 11 and 12 are unmanned aircraft which fly using, for example, propellers driven by battery-driven motors. Note that the drones 11 and 12 may fly in another flying method using another drive system. The drones 11 and 12 are used to transfer workpieces W1 and W2 to be processed in the manufacturing process stations 21 to 26. For this purpose, the drones 11 and 12 have mechanical parts for hanging the workpieces W1 and W2 therefrom and releasing the same.

The drones 11 and 12 are controlled by a higher-level computer, for example, a server 5. The server 5 intensively manages the flight route, moving speed, the position in height, etc. of the drones 11 and 12 in accordance with a predetermined operation program. Note that the moving speeds of the drones 11 and 12 are set to be identical at a predetermined speed.

In the present invention, the server 5 analyzes information regarding, for example, the design specification and production equipment of required products or the order of customers. Then the server 5 decides the type of workpieces, for example, materials or components to be used, and selects some of the manufacturing process stations 21 to 26 and then decides the sequence of the selected stations, based on results of the analysis. This causes the transfer routes of the workpieces W1 and W2 and the flight routes of the drones 11 and 12 to be calculated. The flight routes are transmitted from the server 5 to the drones 11 and 12 by wireless communication.

In the example shown in FIG. 1, the flight route of the drone 11 is designated by black arrows. As can be seen from FIG. 1, the drone 11 transfers the workpiece W1 to the manufacturing process station 21, the cutting station 22, the grinding station 25, and the manufacturing process station 26 in this order, and the workpiece W1 is processed at each station.

Likewise, the flight route of the drone 12 is designated by white arrows. The drone 12 transfers the workpiece W2 to the injection molding station 24, the grinding station 25, and the painting station 23 in this order, and the workpiece W2 is processed at each station.

When a flight route of the drone 11 is calculated, matching between the drone 11 and the workpiece W1 and the positions of the manufacturing process stations 21 to 26 should be at least taken into consideration. Alternatively, the flight route should be calculated by taking another flight route of the drone 12 into consideration, as will be described later. For such calculation, large computing power is required. Thus, if the drones 11 and 12 calculate their flight routes by themselves, the prices of the drones 11 and 12 may increase. Thus, in the present invention, the server 5 calculates the flight routes of the drones 11 and 12 together with the transfer routes of the workpieces W1 and W2, and transmits results of the calculation to the drones 11 and 12 by wireless communication.

Note that, for matching between the drones 11 and 12 and the workpieces W1 and W2, the workpieces W1 and W2 should be separately identified. Thus, it is preferable that the workpieces W1 and W2 have their specific wireless tags. The drones 11 and 12 can establish matching by reading the IDs of the wireless tags via wireless communication and transmitting the same to the server 5. This enables the drones 11 and 12 to identify the workpieces W1 and W2.

In the present invention, when the design specification, etc., of products are changed in accordance with the demand of customers, the server 5 decides again, according to the change, the transfer routes of the workpieces W1 and W2 and the flight routes of the drones 11 and 12, to change, for example, the sequence of the manufacturing process stations.

In the present invention, workpieces are transferred by the drones 11 and 12, and accordingly, the transfer routes among the manufacturing process stations can be three-dimensionally selected taking the position in height into consideration. Thus, in the present invention, the arrangement and sequence of manufacturing process stations can be substantially changed depending on the types of products, to change, for example, the transfer routes of the workpieces W1 and W2. Consequently, competitive products customized in accordance with the demand of customers can be individually produced. Note that the same effect would be obviously obtained if only the drone 11 is used.

Figure 5:
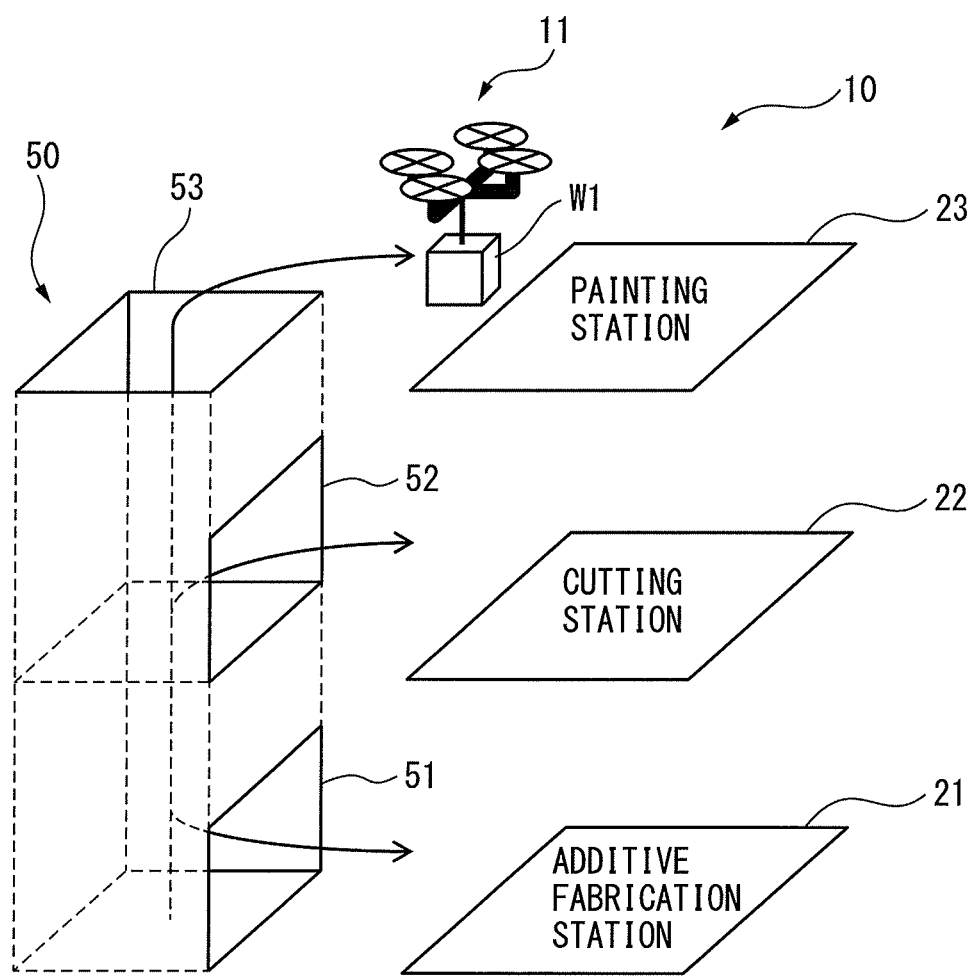
FIG. 5 is a diagram of a manufacturing system according to another embodiment of the present invention.

FIG. 5 is a diagram of a manufacturing system according to another embodiment of the present invention. In the manufacturing system 10 shown in FIG. 5, the additive fabrication station 21 is disposed on the first floor in a factory building. The cutting station 22 and the painting station 23 are respectively disposed on the second and third floors at positions corresponding to the position of the additive fabrication station 21. Note that the drone 12 and the injection molding station 24 to the assembling station 26 are omitted to simplify the explanation.

Further, an open ceiling space 50 extending vertically in the building is formed in the vicinity of the additive fabrication station 21 to the painting station 23. In the open ceiling space 50, opening parts 51 to 53 respectively adjacent to the additive fabrication station 21 to the painting station 23 are formed.

As designated by arrows in FIG. 5, the drone 11 can move through the open ceiling space 50 between the additive fabrication station 21 and the painting station 23 while transferring the workpiece W1. In such a case, the drone 11 moves mainly vertically, and accordingly, the flight route can be easily changed in a multi-story factory building, and the flight distance can be reduced. Further, the necessary land area is reduced, and accordingly, the land of the factory can be effectively used.

Note that, when the drones 11 and 12 fly, the drones 11 and 12 may collide with peripheral equipment or persons, and may cause accidental falls of the workpieces W1 and W2 while transferring the same. Thus, the server 5 needs to calculate the flight routes of the drones 11 and 12 to sufficiently ensure the safety.

Note that, when the drones 11 and 12 perform wireless communication using the wireless tags to identify the workpieces W1 and W2, the accidental falls of the workpieces W1 and W2 can be detected by the availability of wireless communication. In other words, when the wireless communication using the wireless tags becomes impossible, the workpieces W1 and W2 can be determined to have accidentally fallen down. Alternatively, the accidental falls of the workpieces W1 and W2 may be determined when the response time of wireless communication, based on which the communication distance is estimated, is delayed. Note that the communication distance when passive RFID tags are used varies from several centimeters to several meters depending on frequency band. In this instance, it is possible to select the flight routes appropriate to the workpieces W1 and W2, and it is possible to quickly detect the accidental falls of the workpieces W1 and W2 and then transmit the same to an operator.

Specifically, the following conditions are set to calculate a flight route.

(1) A drone does not collide with peripheral equipment etc.

(2) A drone does not fly above a person.

(3) A distance of a predetermined value or more is maintained between a drone and a person.

Figure 2:
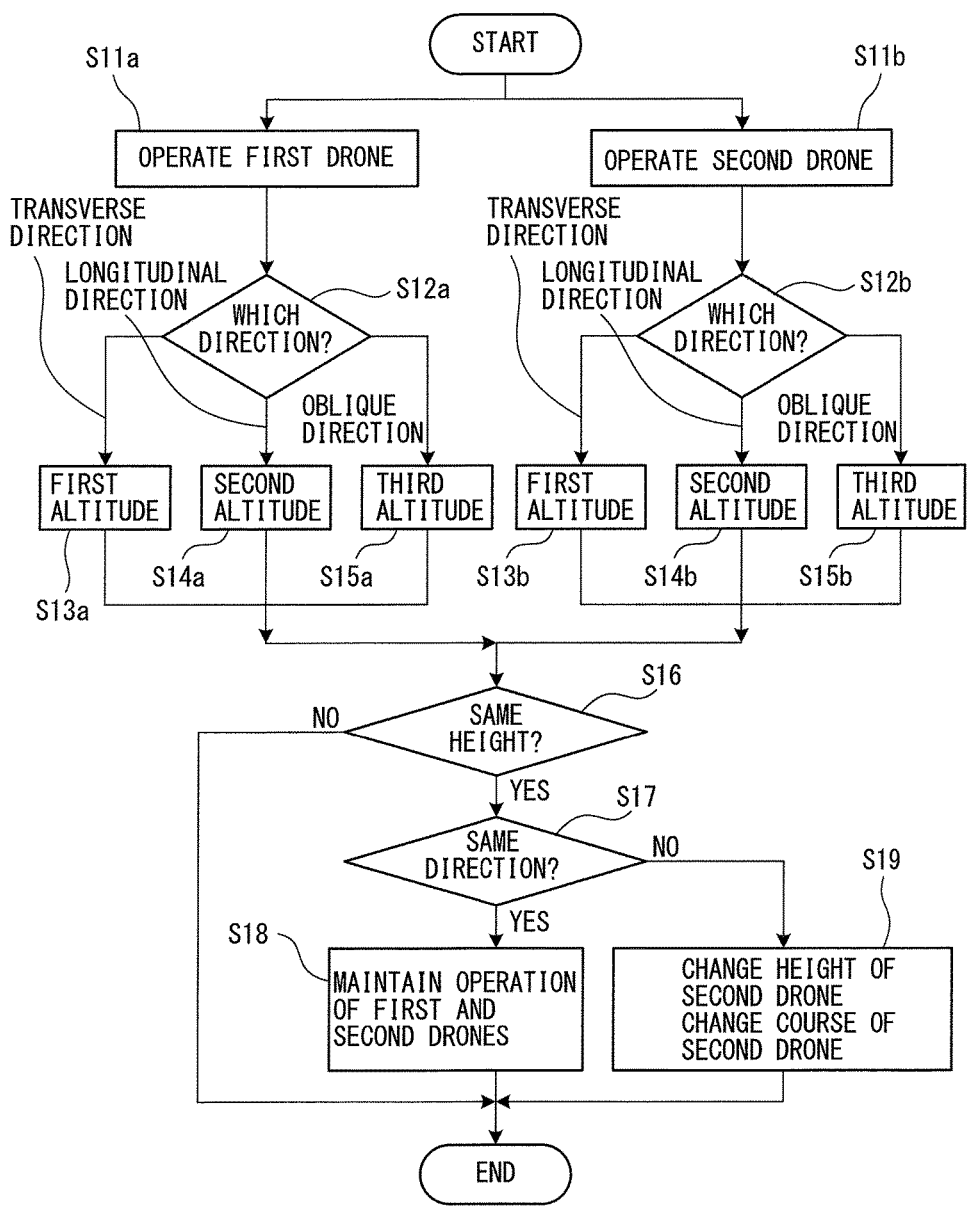
FIG. 2 is a flowchart of the operation of an example of the manufacturing system shown in FIG. 1.

FIG. 2 is a flowchart of an example of the operation of the manufacturing system shown in FIG. 1. The process shown in FIG. 2 is executed at predetermined intervals of control, after the server 5 calculates the flight routes of the drones 11 and 12. In the following description, the drone 11 is referred to as a first drone 11, and the drone 12 is referred to as a second drone 12.

First, in steps S11a and S11b, the first drone 11 and the second drone 12 start to move along the flight routes calculated by the server 5. In step S12a, which one of the transverse direction, the longitudinal direction, and the oblique direction in FIG. 1 corresponds to the current moving direction of the first drone 11 is detected.

In FIG. 1, a direction, for example, from the additive fabrication station 21 toward the injection molding station 24 corresponds to the transverse direction, and a direction, for example, from the additive fabrication station 21 toward the cutting station 22 corresponds to the longitudinal direction. A direction, for example, from the grinding station 25 toward the painting station 23 corresponds to the oblique direction.

When the current moving direction of the first drone 11 is the transverse direction, the first drone 11 is controlled to fly at a first altitude in step S13a. FIG. 3 is a view illustrating the position in height of a drone. As shown in FIG. 3, the first altitude is the lowest one of predetermined three altitudes.

When the current moving direction of the first drone 11 is the longitudinal direction, the first drone 11 is controlled to fly at a second altitude higher than the first altitude in step S14a. When the current moving direction of the first drone 11 is the oblique direction, the first drone 11 is controlled to fly at a third altitude higher than the second altitude in step S15a. In steps S12b to S15b, the same setting in height is applied to the second drone 12.

Subsequently, in step S16, whether the height of the first drone 11 is identical to the height of the second drone 12 is determined. When the fact that the height of the first drone 11 is not identical to the height of the second drone 12 is determined, there is no possibility that the first drone 11 and the second drone 12 collide with each other, and accordingly, the process ends.

By contrast, when the fact that the first drone 11 and the second drone 12 are positioned at the same height is determined, the process shifts to step S17. In step S17, whether the moving direction of the first drone 11 is identical to the moving direction of the second drone 12 is further determined.

When the fact that the first drone 11 and the second drone 12 move in the same moving direction is determined, the process shifts to step S18. In step S18, the first drone 11 and the second drone 12 maintain to fly along their flight routes at the current height. This is because, when the first drone 11 and the second drone 12 move in the same moving direction, the first drone 11 and the second drone 12 would not collide with each other even if they fly at the same height.

By contrast, the fact that the first drone 11 and the second drone 12 do not move in the same direction is determined, the process shifts to step S19. Note that, even when both the first drone 11 and the second drone 12 move in, for example, the longitudinal direction, the process may shift to step S19 in some cases. Examples of such cases include a case in which the first drone 11 moves, for example, from the additive fabrication station 21 toward the cutting station 22, and at the same time, the second drone 12 moves, for example, from the cutting station 22 toward the additive fabrication station 21.

In other words, in such cases, both the first drone 11 and the second drone 12 move in a common direction that is one of the transverse direction, the longitudinal direction, and the oblique direction, but one of the first drone 11 and the second drone 12 moves forward and the other moves backward in the common direction.

In these cases, in step S19, the height of only the second drone 12 is temporarily changed. Alternatively, the moving direction of the second drone 12 is temporarily changed so that the second drone 12 circumvents the first drone 11. In other words, the second drone 12 is only required to temporarily change its moving direction to a specific direction, for example, a right direction before colliding with the first drone 11, and to return the moving direction to the original direction after circumventing the first drone 11. This prevents the first drone 11 and the second drone 12 to collide with each other.

Note that, in order to enhance the safety, the drones 11 and 12 may be provided with movable body detectors, for example, cameras. The information obtained by the movable body detectors is transmitted to the server 5 at intervals of a predetermined period of time, and then is analyzed by the server 5. When another drone is observed in the moving directions of the drones 11 and 12, it is preferable that the heights or moving directions of the drones 11 and 12 are temporarily changed. This prevents a drone from colliding with another drone.

When the drones 11 and 12 are provided with cameras, the cameras may be used for another application. When the positions of the drones 11 and 12 are detected via, for example, a wireless LAN, the accuracy of the positions is approximately one to several meters. Thus, the landing accuracy can be improved by using images captured by the cameras, to fine-tune landing sites of the drones 11 and 12. This reduces the risk of, for example, collision which may occur when the drones 11 and 12 land.

Further, the cameras can detect unexpected obstacles, and accordingly, can confirm the safety of landing sites. Thus, the number of accidents in the drones 11 and 12 can be reduced, and the operation rate of the manufacturing system 10 can be improved.

Note that, in the embodiments described with reference to FIGS. 1, 2, etc., two drones 11 and 12 are shown. However, the manufacturing system 10 may include additional drones. In such a case, each of drones including additional drones is numbered. Further, a pair of drones are selected from all drones, and, based on the numbers applied to the selected pair of drones, the process similar to that described in FIG. 2 is executed.

In other words, in step S19, one drone having a number larger than that of the other drone is controlled to change its height and moving direction. It is preferable that such a process is executed for all pairs of drones. Thus, it will be understood that all drones are prevented from colliding with one another.

In the meantime, the manufacturing process stations 21 to 26 of the manufacturing system 10 may use oil, for example, cutting oil or lubricant oil in some cases. Such oil spreads, in the form of a mist, over the vicinity of the manufacturing system 10, and then adheres to the drones 11 and 12 in some cases.

Thus, oil may adhere to motors (not shown) for driving propellers of the drones 11 and 12. In such a case, the rotational friction of the propellers may increase, the number of rotations of the propellers may reduce, or the propellers may not rotate. Thus, the moving speed of the drones 11 and 12 may not reach a predetermined speed, and the manufacturing efficiency of the manufacturing system 10 may reduce.

Further, when the drones 11 and 12 are provided with the movable body detectors, for example, cameras, the visibility reduces, and accordingly, the movable body detectors cannot acquire accurate information. Thus, it may be difficult to temporarily circumvent the drones 11 and 12. Further, when oil, which can penetrate and attack printed circuit boards used in the drones 11 and 12, spreads, circuits on the printed circuit boards may break due to corrosion, and the first drone 11 and the second drone 12 may break down.

Thus, it is preferable that the drones 11 and 12 periodically move to the detecting station 31 in response to commands from the server 5. Alternatively, the server 5 may cause the drones 11 and 12 to move to the detecting station 31 after the workpieces W1 and W2 to be transferred by the drones 11 and 12 are processed and finished at their final process station, for example, the painting station 23 or the manufacturing station 26.

In the detecting station 31, a previously installed camera or the like captures images of the drones 11 and 12, to detect the contamination or corrosion of the drones 11 and 12. When the contamination or corrosion is detected, the drones 11 and 12 is moved to and washed in the washing station 32.

Note that, even when the corrosion is not detected, if a predetermined time has elapsed from the previous washing, the server 5 may, for example, cause the drones 11 and 12 to move to the washing station 32 and to be washed for preventive maintenance.

Further, when, for example, the contamination is not removed by washing, or the corrosion is severe, i.e., impairment of the function of the drones 11 and 12 is anticipated, the drones 11 and 12 may be, for example, collected to consider repair or disposal of the drones.

Thus, the breakdown of the drones 11 and 12 or the reduction of the function of the drones 11 and 12 can be avoided. Because of this, the manufacturing efficiency or the safety performance of the manufacturing system 10 can be prevented from reducing. Note that, when the drones 11 and 12 move to the detecting station 31 or the washing station 32, the server 5 may, for example, operate another drone (not shown) instead.

Figure 4A:
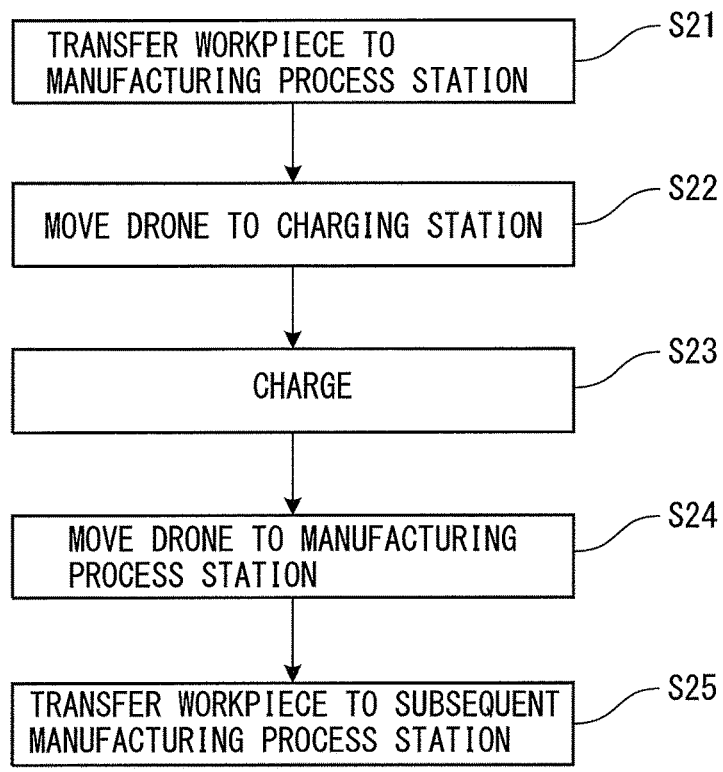
FIG. 4A is a view of the operation of a drone when a charging station is not included in manufacturing process stations.
Figure 4B:
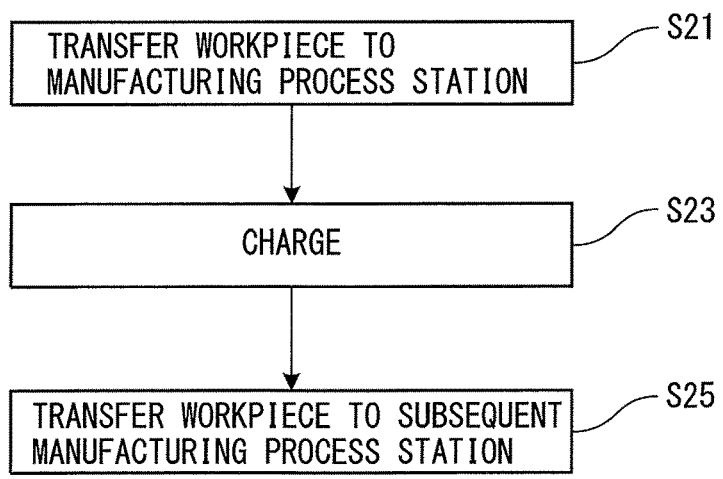
FIG. 4B is a view of the operation of a drone when a charging station is included in manufacturing process stations.

FIGS. 4A and 4B are views of the operation of a drone. In these figures, the operation of the drone 11 is described as an example, but the same is true in the drone 12. In these figures, the charging of a battery of the drone 11 is described. FIG. 4A shows that a charging station 40 is not included in the manufacturing process stations, and the charging station 40 is disposed at a position (not shown) spaced from the manufacturing system 10.

In FIG. 4A, in step S21, the drone 11 transfers the workpiece W1 to a predetermined manufacturing process station. While the workpiece W1 is processed in the manufacturing process station, the drone 11 moves to the charging station 40 spaced from the manufacturing system 10 (step S22).

Subsequently, a battery of the drone 11 is charged at the charging station 40 (step S23). When the charging is complete, in step S23, the drone 11 is returned to the original point, i.e., the manufacturing process station described above. Then, in step S24, the drone 11 hangs again the workpiece W1 therefrom, and transfers the same to a subsequent manufacturing process station.

Such a case requires a travel time for which the drone 11 moves from the manufacturing process station to the charging station 40 (step S22) and a travel time for which the drone 11 moves from the charging station 40 to the manufacturing process station after the completion of charging (step S24).

In this respect, in the present invention, several manufacturing process stations, for example, the cutting station 22 and the painting station 23 are provided with charging stations 40 as shown in FIG. 1. As shown in FIG. 4B, the battery of the drone 11 can be charged by the charging station 40 within the manufacturing process station (step S23), without the necessity that the drone 11 moves to another station after having reached the manufacturing process station in step S21.

In other words, in this instance, a travel time necessary to move the drone from the manufacturing process station to the charging station 40 is not required. Likewise, after the completion of charging, the drone 11 can transfer a workpiece to a subsequent manufacturing process station (step S25) without moving from the charging station 40 to the manufacturing process station, and accordingly, a travel time is not necessary after the completion of charging.

As seen above, when a manufacturing process station is provided with a charging station 40, the drone 11 is not required to move away from the manufacturing system 10.

Further, the battery of the drone 11 can be charged when the manufacturing process station processes the workpiece W1. Thus, the reduction of the efficiency of the manufacturing system 10 can be avoided. Further, the battery of the drone 11 needs only a small capacity, and accordingly, the price of the drone 11 can be reduced, and the weight capacity of the drone 11 can be improved.

Note that, when the drones 11 and 12 operate using fuel, such as gasoline or hydrogen, a filling station for filling fuel may be provided instead of the charging station.

Effect of the Invention

In the first aspect of the invention, a drone transfers a workpiece, and accordingly, a transfer route among manufacturing process stations can be three-dimensionally selected. Thus, the flexibility in selection of a transfer route increases, and accordingly, the transfer route can be easily changed. Further, the arrangement and sequence of the manufacturing process stations can be substantially changed depending on the types of products. Thus, the products can be easily and individually customized in accordance with the demand of customers.

In the second aspect of the invention, a drone can transfer a workpiece from a first floor, e.g., a lower floor to a second floor, e.g., an upper floor, and accordingly, a transfer route can be easily changed in a multi-story factory building. Further, the entire factory can be effectively used, or the flight distance can be reduced.

In the third aspect of the invention, a server can optimally calculate a flight route of a drone based on, for example, the position of the manufacturing process stations. Further, the drone itself is not required to calculate a flight route, and accordingly, does not need a high computing power. Thus, the price of the drone can be reduced, and the flexibility in selection of the drone can be enhanced.

In the fourth aspect of invention, the breakdown of a drone due to oil to be used in the manufacturing process stations, for example, cutting oil or lubricant oil, and the reduction of the function of the drone can be avoided. Consequently, the reduction of the manufacturing efficiency of the manufacturing system or the reduction of the safety performance can be prevented.

In the fifth aspect of the invention, a battery of the drone can be charged, when a manufacturing process station processes a workpiece, without the necessity that the drone moves away from the manufacturing system. Thus, the efficiency of the manufacturing system can be prevented from reducing. Further, the battery of the drone needs only a small capacity, and accordingly, the price of the drone can be reduced, and the weight capacity of the drone can be improved.

In the sixth aspect of the invention, the workpiece transferred by the drone can be verified, and accordingly, the flight route can be selected depending on the type of the workpiece. Further, an accidental fall of the workpiece can be quickly detected, and the detected data can be quickly transmitted to an operator.

In the seventh aspect of the invention, at least one of avoidance of collision with another drone, fine tuning of a landing site, and confirmation of safety can be performed, and accordingly, the number of accidents or failures in drones can be reduced to improve the operation rate of the manufacturing system.

The present invention has been described above using exemplary embodiments. However, a person skilled in the art would understand that the aforementioned modifications and various other modifications, omissions, and additions can be made without departing from the scope of the present invention.

What is claimed is:

1. A manufacturing system comprising:
   a plurality of manufacturing process stations for processing a workpiece; and
   at least one drone for transferring the workpiece among the plurality of manufacturing process stations,
   at least one of the plurality of manufacturing process stations is disposed on a lower floor,
   the remaining manufacturing process stations are disposed on an upper floor, which is located upper than the lower floor, and
   the drone transfers the workpiece via an open ceiling space between the lower floor and the upper floor.

2. The manufacturing system according to claim 1, further comprising a server for intensively managing a flight route of the at least one drone, wherein
   the server transmits a command to the at least one drone by wireless communication.

3. The manufacturing system according to claim 2, further comprising:
   a detecting station for detecting contamination or corrosion of the at least one drone; and
   a washing station for washing the at least one drone when the detecting station detects contamination or corrosion of the at least one drone or when a certain period of time elapses after the at least one drone is washed, wherein
   the at least one drone moves to the detecting station in response to a command from the server.

4. The manufacturing system according to claim 1, wherein at least one of the plurality of manufacturing process stations includes a charging station for charging a battery as a power source of the at least one drone.

5. The manufacturing system according to claim 1, wherein
   the workpiece has a wireless tag, and
   the at least one drone performs one of identification of the workpiece detection of an accidental fall of the workpiece, by wireless communication via the wireless tag.

6. The manufacturing system according to claim 1, wherein the at least one drone has a camera, and the at least one drone performs, using the camera, at least one of avoidance of collision with another drone, fine tuning of a landing site, and confirmation of safety.

7. A manufacturing system comprising:
   a plurality of manufacturing process stations for processing a workpiece; and
   at least one drone for transferring the workpiece among the plurality of manufacturing process stations;
   a server for intensively managing a flight route of the at least one drone, the server transmits a command to the at least one drone by wireless communication;
   a detecting station for detecting contamination or corrosion of the at least one drone; and
   a washing station for washing the at least one drone when the detecting station detects contamination or corrosion of the at least one drone or when a certain period of time elapses after the at least one drone is washed, wherein
   the at least one drone moves to the detecting station in response to a command from the server.

8. The manufacturing system according to claim 7, wherein at least one of the plurality of manufacturing process stations is disposed on a lower floor, the remaining manufacturing process stations are disposed on an upper floor, and, which is located upper than the lower floor, the drone transfers the workpiece via an open ceiling space between the lower floor and the upper floor.

9. The manufacturing system according to claim 7, wherein at least one of the plurality of manufacturing process stations includes a charging station for charging a battery as a power source of the at least one drone.

10. The manufacturing system according to claim 7, wherein the workpiece has a wireless tag, and the at least one drone performs one of identification of the workpiece detection of an accidental fall of the workpiece, by wireless communication via the wireless tag.

11. The manufacturing system according to claim 7, wherein the at least one drone has a camera, and the at least one drone performs, using the camera, at least one of avoidance of collision with another drone, fine tuning of a landing site, and confirmation of safety.

* * * * *